(12) United States Patent
Kakade et al.

(10) Patent No.: US 8,903,800 B2
(45) Date of Patent: Dec. 2, 2014

(54) SYSTEM AND METHOD FOR INDEXING FOOD PROVIDERS AND USE OF THE INDEX IN SEARCH ENGINES

(75) Inventors: Vinay Kakade, Sunnyvale, CA (US); Sathiya Keerthi Selvaraj, Cupertino, CA (US); Philip Bohannon, Cupertino, CA (US)

(73) Assignee: Yahoo!, Inc., Sunnyvale, CA (US)

( * ) Notice: Subject to any disclaimer, the term of this patent is extended or adjusted under 35 U.S.C. 154(b) by 303 days.

(21) Appl. No.: 12/792,447

(22) Filed: Jun. 2, 2010

(65) Prior Publication Data

US 2011/0302148 A1 Dec. 8, 2011

(51) Int. Cl.
*G06F 7/00* (2006.01)
*G06F 17/30* (2006.01)
*G06Q 30/02* (2012.01)
*G06Q 50/12* (2012.01)

(52) U.S. Cl.
CPC .... *G06F 17/30864* (2013.01); *G06F 17/30873* (2013.01); *G06Q 30/0282* (2013.01); *G06Q 50/12* (2013.01); *G06Q 30/0201* (2013.01); *G06F 17/30876* (2013.01)
USPC .......................................... 707/710; 707/705

(58) Field of Classification Search
CPC ................... G06F 17/30864; G06F 17/30707; G06F 17/30873; G06Q 30/02; G06Q 10/10
See application file for complete search history.

(56) References Cited

U.S. PATENT DOCUMENTS

| | | | |
|---|---|---|---|
| 6,741,969 B1 * | 5/2004 | Chen et al. | 705/14.27 |
| 7,319,994 B1 * | 1/2008 | Sercinoglu | 1/1 |
| 7,461,528 B2 * | 12/2008 | Taniguchi et al. | 70/207 |
| 7,606,581 B2 * | 10/2009 | Riise et al. | 455/456.1 |
| 7,996,393 B1 * | 8/2011 | Nanno et al. | 707/723 |
| 2003/0200139 A1 * | 10/2003 | Yan | 705/14 |
| 2004/0044578 A1 * | 3/2004 | Kim et al. | 705/15 |
| 2005/0149507 A1 * | 7/2005 | Nye | 707/3 |
| 2005/0149576 A1 * | 7/2005 | Marmaros et al. | 707/200 |
| 2005/0203799 A1 * | 9/2005 | Faber et al. | 705/14 |
| 2006/0101003 A1 * | 5/2006 | Carson et al. | 707/3 |
| 2006/0200309 A1 * | 9/2006 | Yu et al. | 701/208 |
| 2006/0230021 A1 * | 10/2006 | Diab et al. | 707/3 |
| 2006/0277477 A1 * | 12/2006 | Christenson | 715/760 |
| 2007/0022085 A1 * | 1/2007 | Kulkarni | 707/1 |
| 2007/0032247 A1 * | 2/2007 | Shaffer et al. | 455/456.1 |
| 2007/0112777 A1 * | 5/2007 | Field et al. | 707/10 |
| 2007/0130125 A1 * | 6/2007 | Holte | 707/3 |
| 2007/0233808 A1 * | 10/2007 | Egnor et al. | 709/217 |
| 2007/0288437 A1 * | 12/2007 | Xia | 707/3 |
| 2007/0294240 A1 * | 12/2007 | Steele et al. | 707/5 |
| 2008/0034058 A1 * | 2/2008 | Korman et al. | 709/217 |

(Continued)

*Primary Examiner* — Ajay Bhatia
*Assistant Examiner* — Jessica N Le
(74) *Attorney, Agent, or Firm* — Berkeley Law & Technology Group, LLP

(57) ABSTRACT

Methods, systems and computer readable mediums are provided for indexing network resources. One method includes accessing, using one or more computer systems, a data store of menu items. The method further includes accessing identification information associated with one or more food providers from one or more data sources. One or more network resources are crawled based on the identification information to search for one or more menu items in the data store of menu items associated with corresponding ones of the food providers. Using the one or more computing systems, an index feed is generated, the index feed comprising the identification information of one or more of the food providers, and one or more menu items associated with the identification information of corresponding food providers based on the crawl and search.

17 Claims, 5 Drawing Sheets

(56) References Cited

U.S. PATENT DOCUMENTS

| | | | |
|---|---|---|---|
| 2008/0040327 A1* | 2/2008 | Chang et al. | 707/3 |
| 2008/0104055 A1* | 5/2008 | Segel | 707/5 |
| 2008/0104059 A1* | 5/2008 | Segel | 707/5 |
| 2008/0126476 A1* | 5/2008 | Nicholas et al. | 709/203 |
| 2008/0133488 A1* | 6/2008 | Bandaru et al. | 707/3 |
| 2009/0018916 A1* | 1/2009 | Seven et al. | 705/14 |
| 2009/0119268 A1* | 5/2009 | Bandaru et al. | 707/3 |
| 2009/0132513 A1* | 5/2009 | McKee et al. | 707/5 |
| 2009/0132645 A1* | 5/2009 | Yang et al. | 709/203 |
| 2009/0144264 A1* | 6/2009 | Singh et al. | 707/5 |
| 2009/0157752 A1* | 6/2009 | Gonzalez | 707/104.1 |
| 2009/0204492 A1* | 8/2009 | Scifo et al. | 705/14 |
| 2009/0240564 A1* | 9/2009 | Boerries et al. | 705/10 |
| 2009/0282022 A1* | 11/2009 | Bennett | 707/5 |
| 2009/0287698 A1* | 11/2009 | Marmaros et al. | 707/5 |
| 2009/0319484 A1* | 12/2009 | Golbandi et al. | 707/3 |
| 2010/0082590 A1* | 4/2010 | Nye | 707/706 |
| 2010/0179876 A1* | 7/2010 | Holte | 705/14.54 |
| 2010/0250562 A1* | 9/2010 | Siladic | 707/755 |
| 2011/0087646 A1* | 4/2011 | Dalvi et al. | 707/709 |
| 2011/0167054 A1* | 7/2011 | Bailey et al. | 707/710 |
| 2011/0225142 A1* | 9/2011 | McDonald | 707/710 |
| 2011/0238762 A1* | 9/2011 | Soni et al. | 709/206 |
| 2011/0252011 A1* | 10/2011 | Morris et al. | 707/706 |

\* cited by examiner

YAHOO! Restaurant Search

[Orange chicken near New York |] — 402

[Search] — 404

Results for Orange chicken near New York　　　　　　Page 1

Grill Delight　　541 Columbus Ave, NY

Menu: …..Chicken Finger, Orange chicken….

www.grilldelight.com

Orchard Garden　　485 Fashion Ave, NY

Menu: ….Chicken salad, Orange chicken...

www.orchardgarden.com

Moe's　　134 Houston street, NY

Menu: ...Fried chicken, Orange chicken…..

www.moes.com

Forks　　80 Beekman Street, NY

Menu: ...Chicken sandwich, Orange chicken...

www.forks.com

[2] [3] [4] [5] [Next >]

*FIG. 4*

SYSTEM AND METHOD FOR INDEXING FOOD PROVIDERS AND USE OF THE INDEX IN SEARCH ENGINES

TECHNICAL FIELD

The present disclosure generally relates to indexing, and more specifically to indexing food providers and restaurants.

BACKGROUND

With consideration to the surge of information on the World Wide Web, it has become essential to keep up with the demand for information put forth by the users of search engines. Current search engines (Google, Yahoo!, Bing) mainly concentrate upon keyword based searches to retrieve relevant results in response to user queries. General purpose search engines introduce a large amount of results. Often, the number of relevant results in the search results is quite small.

For example, users searching for restaurants serving their favorite menu item may enter a search query such as "chicken wings in Orange County". Such queries may yield a very large number of web pages that the user may have to sort through before identifying a small set of web pages of restaurants in Orange County, that serve chicken wings.

To address the requirement of users to search specific types of content, special purpose search engines exist. Special purpose search engines index only specific types of online content, such as, scholarly publications, patent documents, music and movie content, and so forth. However, such search engines may index a small number of well known online network resources and databases. For instance, a patent search engine may index only the web pages hosted by the various Patent and Trademark Office websites.

Building an index for a special purpose search engine for, say restaurant search, may be time consuming and resource intensive, requiring information such as restaurant names, addresses, telephone numbers, menu served by the restaurants, cuisines, and so forth. The number of restaurants may keep changing with time—with new restaurants being established, and existing ones being shut-down or relocated frequently. Further, the menu offered by these restaurants may also be constantly updated by the restaurants. The restaurants may not have any obligation to reveal such information. Therefore, it is very difficult to index entities, such as restaurants, including associated information such as menu items.

SUMMARY

Methods, systems and computer readable mediums are provided for indexing network resources. One method includes accessing, using one or more computer systems, a data store of menu items. The method further includes accessing identification information associated with one or more food providers from one or more data sources. One or more network resources are crawled based on the identification information to search for one or more menu items in the data store of menu items associated with corresponding ones of the food providers. Using the one or more computing systems, an index feed is generated, the index feed comprising the identification information of one or more of the food providers, and one or more menu items associated with the identification information of corresponding food providers based on the crawl and search.

BRIEF DESCRIPTION OF THE DRAWINGS

The features and advantages of various embodiments of the present invention will become more apparent from the detailed description set forth below when taken in conjunction with the drawings in which like reference numbers indicate identical or functionally similar elements.

FIG. 4 is an example interface used be a search engine employing the index feed generated by the indexing system, according to one embodiment of the present invention.

DETAILED DESCRIPTION

Figure 1:
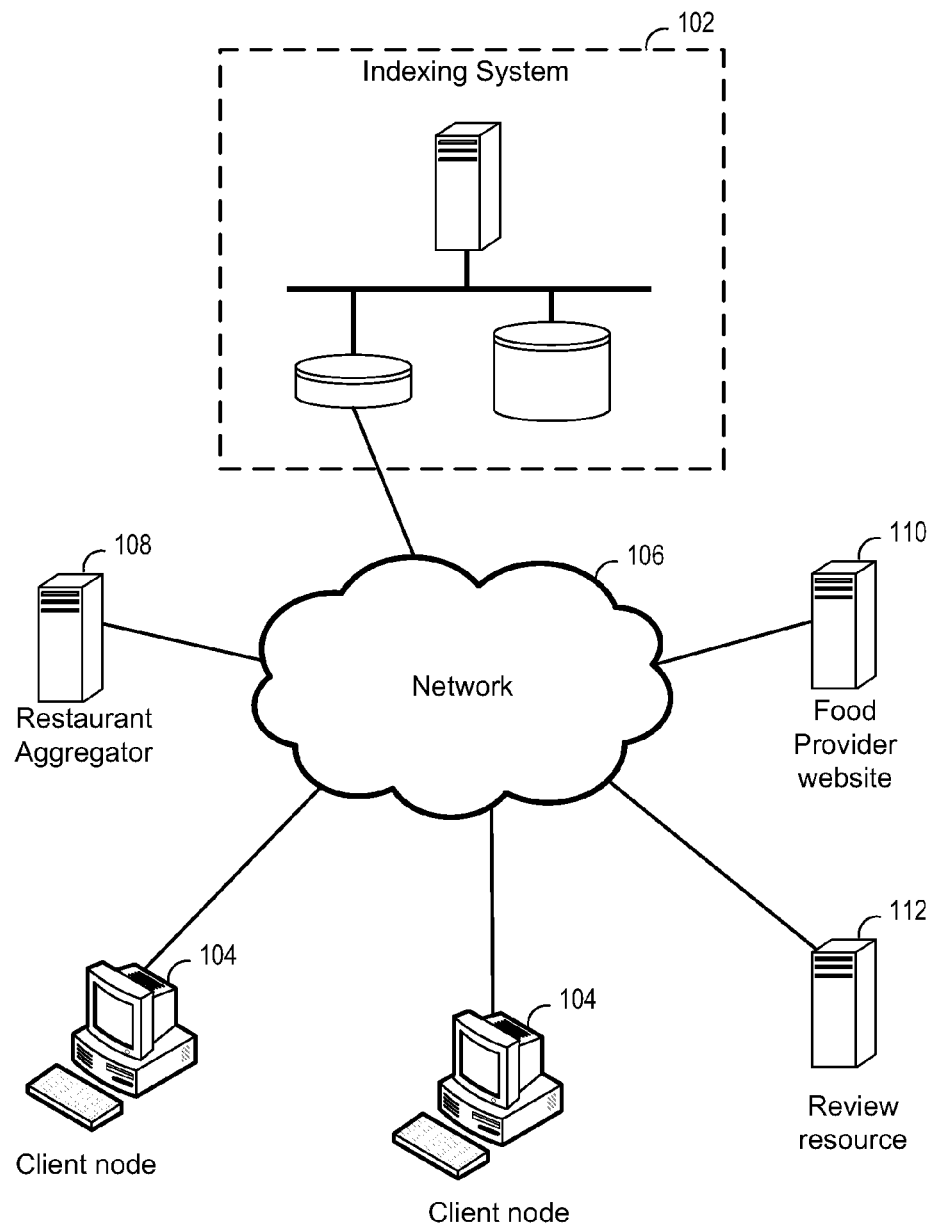
FIG. 1 is an example environment in which an indexing system may be deployed, according to one embodiment of the present invention.

FIG. 1 illustrates an implementation of a network environment 100 in which particular implementations of the invention may be deployed according to one embodiment. The network environment 100 includes an indexing system 102, one or more client nodes 104, a network 106, one or more restaurant aggregators 108, one or more food provider websites 110 and one or more review resources 112. The network 106 generally represents one or more interconnected networks, over which indexing system 102, the restaurant aggregators 108, the food provider websites 110, the review resources 112 and the one or more client nodes 104 may communicate with each other. Network 106 may include packet-based wide area networks (such as the Internet), local area networks (LAN), private networks, wireless networks, satellite networks, cellular networks, paging networks, and the like. A person skilled in the art will recognize that the network 106 may also be a combination of more than one type of network. For example, network 106 may be a combination of a LAN and the Internet. In addition, network 106 may be implemented as a wired network, or a wireless network or a combination thereof. Client nodes 104 are communicatively coupled to network 106 via a network service provider or any other suitable methods known in the art.

Client Nodes

Client node 104 is a computing device from which a client accesses the services provided by the restaurant indexing system 102. Client node 104 has the capability to communicate over the network 106. Client node 104 further has the capability to provide the user an interface 400 to interact with the services provided by the restaurant indexing system 102. Client node 104 may be, for example, a desktop computer, a laptop computer, a mobile phone, a personal digital assistant, and the like. A client node may execute one or more client applications such as, without limitation, a web browser to access and view content over a computer network, an email client to send and retrieve emails, an instant messaging client for communicating with other users, and a File Transfer Protocol (FTP) client for file transfer. Client nodes 104, in various embodiments, may include a Wireless Application Protocol (WAP) browser or other wireless or mobile device protocol suites such as, without limitation, NTT DoCoMo's i-mode wireless network service protocol suites, EDGE, and the like.

Restaurant Aggregator

Restaurant aggregators 108 are network resources, which aggregate information about one or more food providers. For instance, restaurant aggregator 108 may aggregate, without limitation, names of food providers, street address of the food providers, a map depicting the location of the one or more restaurants, description of the food providers, menu of the food providers, description of the ambience and/or theme of the food providers, reviews of the food providers, ratings of the food providers and the like. Restaurant aggregator 108 may obtain one or more menu items of the food providers by manual entry of the one or more menu items. In one embodiment, restaurant aggregators 108 may be online databases. In another embodiment, restaurant aggregators 108 may be websites.

Food Provider Websites

Food provider websites 110 are network resources owned by or associated with the respective food providers individually. Food provider websites 110 host information such as, but not limited to, name of the food provider, street address of the food provider, phone numbers of the food provider, description of the food provider, affiliates of the food provider, various branches of the food provider, menu of the food provider, special offers provided by the food provider, description of the ambience and/or theme of the food provider, and the like.

Review Resources

Review resources 112 are network resources, which include reviews of the food providers. Review resources 112 may include, without limitation, the name and address of the restaurant, comments or reviews about the one or more restaurants and the like. The comments and reviews may include, without limitation, the menu served at the one or more restaurants, the service at the one or more restaurants, the ambience at the one or more restaurants and the like.

Indexing System

Indexing system 102 generates an index feed of menu items and associated food providers serving the menu items. Indexing system 102 may access a data store of menu items. The data store may be coupled to indexing system 102 over a local area network, or over network 106. Indexing system 102 may then access identification information associated with the food providers from one or more data sources. The identification information includes, without limitation, a name of the food provider, a street address, a phone number, a website URL, and the like. Indexing system 102 may then crawl one or more of the network resources to search for one or more menu items in the data store, the one or more menu items associated with corresponding ones of the food providers. As described above, the network resources may include restaurant aggregators, websites of the food providers, review resources, and so forth. Based on the crawl and search, indexing system 102 may then generate an index feed comprising the identification information of the food providers, and one or more menu items associated with the identification information of the corresponding food providers. An example indexing system 102 and an example process performed by indexing system 102 is described in conjunction with FIG. 2 and FIG. 3, respectively.

In one embodiment, the index feed may be employed by a search engine to facilitate retrieval of information pertaining to the menu items, the food providers, and so forth. In another embodiment, the index feed may be used for compiling a restaurant guide.

Other online network resources (not shown in the figure) may include blogs written about the food providers, newspaper and magazine articles, user generated content at social networking sites, such as Facebook, Orkut, Twitter, and the like. The blogs, newspaper and magazine articles, and user generated content may include reviews of the food providers, criticism of the food providers, comments about the food providers quality of food, ambience, hygiene of the establishment, and so forth. The blogs, newspaper articles, magazine articles, and user generated content may not follow a standard content format. As such, it may not be easy to crawl selected pages of such network resources. Indexing system 102 may thus crawl as many web pages of such network resources as possible, to improve the search of menu items in such network resources. Indexing system 102 may then execute text processors on the crawled content and search for the menu items from such other network resources.

Although FIG. 1 illustrates the foregoing systems as separate systems, the functionality represented by each system may be combined into other systems. Furthermore, the functionality represented by each depicted system may be further separated. Still further, implementations of the present invention may operate in network environments that include multiples of one or more of the individual systems and sites disclosed herein.

Figure 2:
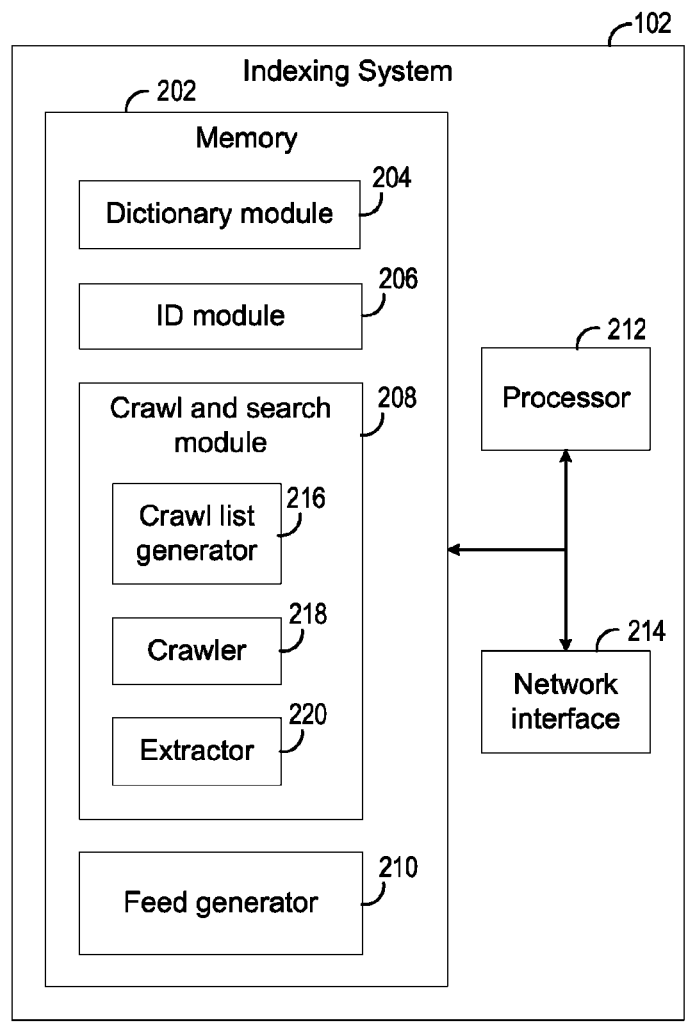
FIG. 2 is a simplified block diagram illustrating an example implementation of the restaurant indexing system, according to one embodiment of the present invention.

FIG. 2 is a simplified block diagram of an example indexing system 102 in accordance with one embodiment. Indexing system 102 includes a memory 202 that further includes a dictionary module 204, an ID module 206, a crawl and search module 208, and feed generator 210. Indexing system 102 may further include one or more processors 212, and a network interface 214.

Dictionary module 204 creates a dictionary of menu items, and stores the menu items in a data store. The data store may include the menu items, corresponding cuisines of the menu items, and a frequency count indicating the number of food providers serving the menu item. The data store may store the menu items, the corresponding cuisines, and the corresponding frequency count in one of a database, a text file, a comma separated file, a tab separated file, and the like. It will be appreciated that the format of the data store may be selected as per the implementation of indexing system 102, and the programming of various data processing algorithms executed by indexing system 102.

In one example embodiment, dictionary module 204 creates the dictionary of menu items by initiating crawl and search module 208 to crawl one or more restaurant aggregators 108 for extracting the menu items. Dictionary module 204 may provide one or more Universal Resource Locators (URL) of the one or more restaurant aggregators 108 to be crawled. Dictionary module 204 may then set crawling policies for crawl and search module 208. Dictionary module 204 may set selection policies such as, crawl URLs having a predefined structure, crawl restaurant aggregators 108 only to a predefined depth, and so forth. For example, crawl URLs under the path http://www.aggregator-xyz.com/foodproviders/, crawl to a depth of 2 directories under the specified path, and so forth. Crawl and search module 208 may then provide the crawled content and associated metadata (such as URL of the content, type of page, time of crawl, and so forth) to dictionary module 204. Dictionary module 204 may then extract the menu items from the crawled content using regular expressions. Dictionary module 204 then stores the extracted menu items in the data store. Dictionary module 204 may also extract the name of the food provider from the crawled content and/or the associated metadata, and store it in the data store.

Dictionary module 204 may also de-duplicate the menu items of the data store. In one example implementation, dictionary module 204 may create a map of the menu items, and a frequency count of occurrence of the corresponding menu items in the data store. Dictionary module 204 may retain the menu items having a predefined frequency count, and discard the others. For instance, dictionary module 204 may retain the menu items having a frequency count greater than one, but less than or equal to four.

In one implementation, one or more operators may editorially review the menu items of the data store. Operator review of the menu items of the data store may address errors and inaccuracies caused by a completely machine implemented process. In order to facilitate the judgment of the operators, certain statistics, for example, the number of times a particular menu item has been queried or the number of times a particular menu item appears in the data store and the like are provided to the operators. With such statistics in mind, the operators may decide whether a menu item is ambiguous or not. For instance, if a menu item has been queried only 5 items in a month then the menu item will be considered ambiguous and may be excluded from the data store ID module 206 may access identification information associated with the food providers from one or more data sources. The identification information includes, without limitation, name of the food provider, a street address, a phone number, a website URL, and the like. The data sources may be coupled to indexing system 102 over a local area network, or over the internet. One example data source may be a business directory such as Yellow Pages®, Yellow Pages Exchange (YPEX), and Yahoo! Local. The business directory may list businesses under one or more categories demarcated by business type, location, size, and so forth. ID module 206 may access the identification information for all businesses listed under a food provider category such as, but not limited to, restaurants, diners, fast food joints, eateries, and the like.

Another example data source may be an aggregator listing including a listing of various food providers, and the URLs of web pages hosted by one or more restaurant aggregators 108. The aggregator listing may be maintained by the restaurant aggregators 108, or stored locally at indexing system 102.

Yet another example data source may be a review resource listing including a listing of URLs of web pages including reviews of the food providers. The web pages including reviews of the food providers may be hosted by the review resources 112. The review resource listing may be maintained by the review resources 112, or stored locally at indexing system 102.

The data sources may store the identification information in one of a database, a text file, a comma separated file, a tab separated file, a Java Script Object Notation file, and the like. ID module 206 may then collate the identification information into a food provider list, and provide the food provider list to crawl and search module 208.

Crawl and search module 208 crawls various network resources to search for the menu items in the data store, based on the identification information received from ID module 206. In one implementation crawl and search module 208 may include a crawl list generator 216, a crawler 218, and an extractor 220. Crawl list generator 216 generates a list of URLs (referred to herein as a crawl list) to visit for crawler 218. Crawl list generator 216 may receive the identification information associated with the food providers as input. Crawl list generator 216 may identify the food providers for whom the identification information includes website URLs of the food provider website. Crawl list generator 216 may add the website URLs to the crawl list. Crawl list generator 216 may also add the URLs of web pages hosted by the restaurant aggregators 108 to the crawl list. Further, crawl list generator 216 may also add the URLs of the web pages including reviews of one or more food providers to the crawl list. In one implementation, crawl list generator 216 may also use the identification information such as category of the food provider, to filter the URLs. Crawl list generator 216 may then generate a crawl list for crawler 218. Crawl list generator 216 may generate a separate crawl list for each category of food providers. Alternatively, crawl list generator 216 may generate a crawl list only for predetermined categories of food providers.

Crawl list generator 216 may then provide the generated crawl list to crawler 218. Crawler 218 may be a standard web crawler including a scheduler for accepting URLs to be visited and specifying timing of the visits to the URLs, a downloader for visiting the URLs and downloading content of the URLs, and a queue for adding hyperlinks on a visited page to the scheduler. In one implementation, crawler 218 may be a parallel crawler, including a multi-threaded downloader.

Crawler 218 may be instructed to crawl the URLs only to a predefined depth. For instance, the crawler 218 may crawl the food provider web site URLs, to a depth of two, the restaurant aggregator 108 URLs and the review resource 112 URLs to a depth of zero and the like. For instance, for the food provider website 110 URL www.la-italia.com crawler 218 crawls through the hyperlinks within the page www.la-italia.com, such as, www.la-italia.com/menu. At crawl depth 2, crawler 218 may crawl through the hyperlinks on the page www.la-italia.com/menu, such as, www.la-italia.com/menu/dessert. Indexing system 102 may take measures to avoid generation of false positives which may occur due to the crawling of food provider website 110 website URLs to the depth of two. The measures may include post processing the crawled pages so as to stay within the domain. For instance, consider the restaurant homepage URL to be www.la-italia.com. The webpage at depth one say, www.la-italia.com/menu may redirect the user to download a copy of Adobe Acrobat Reader® from www.adobe.com. Such pages do not contribute to the index feed generation, and hence may be excluded. Further, the page www.la-italia.com/menu at the depth one may state that in order to obtain the menu items served at its sister counterpart please visit www.lela-belle.com/menu. In order not to confuse the menu of the Le La-Belle as the menu served by La-Italia, the pages which lie out of the domain of La-Italia are excluded from the crawl.

In another embodiment, the measures taken to avoid generation of false positives which occur due to the crawling of the food provider website 110 website URL to the depth of two may include staying below a page if it is not a top level domain. For instance, if the URL is a URL of a restaurant aggregator 108, such as, www.citisearch.com/california/la-italia, crawler 218 is instructed to remain within www.citisearch.com/california/la-italia and not enter into www.citisearch.com/california or www.citisearch.com. Hence, when the URL is not a top level domain crawler 218 may be instructed to stay within the pages below the URL to avoid false positives.

The content of the URLs downloaded by crawler 218 may be stored to a crawled content storage system. In one implementation, the crawled content storage system may store the content of the URLs in one or more tab separated value (TSV) files. The content of the URLs may be stored in separate TSV files based on the type of network resource the URL belongs to. For example, content of the URLs of restaurant aggregators 108 may be stored in a TSV file (referred to herein as restaurant aggregator TSV file), content of the URLs of review resources 112 may be stored in another TSV file (referred to herein as review resource TSV file), and content of the URLs of the food providers may be stored in yet another TSV file (referred to herein as food provider TSV file). The first column of the TSV files may identify the URL of the content, and second column may include the content downloaded from the URL. Crawler 218 may first convert the line feed characters and tab characters of the content downloaded from the URLs into spaces, and then store the content into the TSV file. In one implementation, the crawled content storage may be a Network Attached Storage (NAS) or a Grid Oriented Storage (GOS) system. Such a storage system may be directly coupled with a computation grid for data processing using distributed applications.

Extractor 220 may access the crawled content storage system and search for menu items of the data store in the content downloaded from the URLs. In one implementation, indexing system 102 may split each TSV file into multiple temporary part files to facilitate processing by the computation grid. The temporary part files include the URLs, the content downloaded from the URLs, and a local identifier associated with each URL. The local identifier may identify, for example, the TSV file the temporary part file has been created from. In the grid computing implementation, extractor 220 may be a distributed application. Extractor 220 searches for menu items of the data store within the content downloaded from the URLs. For the restaurant aggregator TSV file, and the review resource TSV file, extractor 220 may also extract attributes such as title of the document. Extractor 220 may store the search results—i.e., menu items extracted from the content, the corresponding URL from which the menu items have been extracted, and optionally the extracted attributes, in the temporary part file. Extractor 220 may execute on a distributed application platform such as Apache Hadoop.

Indexing system 102 may then collate the extracted menu items, and the extracted attributes of the temporary part files into the respective TSV files using the local identifier associated with each URL.

Feed generator 210 may then access the TSV files in the crawled content storage system, and the food provider list to generate an index feed. The index feed includes the identification information of the food providers, and the menu items associated with the corresponding food providers. Feed generator 210 may match the identification information in the TSV files, and the URLs included in the food provider list to associate menu items with the food providers.

In one implementation, feed generator 210 may access the TSV files and match the URLs in the TSV files with the URLs in the food provider list. Feed generator 210 may then associate the extracted menu items included in the TSV files to the corresponding food provider included in the food provider list, based on the matching of URLs. Feed generator 210 then updates the index feed with the food provider and the associated menu items.

In another implementation, an exact match between the URLs in the TSV files and the food provider list may not be possible. For example, URLs of restaurant aggregators 108, or review resources 112 may not directly indicate the food provider to which the URL corresponds. The feed generator 210 may access the TSV files and match the extracted attributes in the TSV files to the identification information in the food provider list. For example, feed generator 210 may match the title of a webpage (i.e. the extracted attribute) to the names of the food providers in the food provider list. Feed generator 210 may then associate the extracted menu items included in the TSV files to the corresponding food provider included in the food provider list, based on the matching of the extracted attributes. Feed generator 210 then updates the index feed with the food provider and the associated menu items.

In one implementation the index feed may be an Extended Markup Language (XML) index feed. The XML index feed may be checked for validity and syntax before use. Certain menu items may be tagged as visible or invisible to include or exclude them from the index feed. For instance, every menu item in the feed may be associated with a tag visibleSuggestion. VisibleSuggestion=false may indicate that the menu item is to be added to the blacklist and visibleSuggestion=true may indicate that the menu item is good enough to be made visible. All the menu items that are present in index feed need not be made visible. For instance, generic names of menu items like pasta or pizza need not be visible. The visibility of menu items may be decided by the generation of unigrams and bigrams of all the menu items in the index feed. For example, penne pasta would generate penne, pasta and penne pasta. The frequencies of all these unigrams and bigrams may then be counted across all the menu items. If the frequency is above a threshold, then such menu items will be tagged as visibleSuggestion=False.

Further, during the index feed generation, certain network resources may be added to a blacklist to exclude them from the index feed. At times, the data sources may incorrectly list an entity as a food provider. For example, the data source may indicate supermarkets as food providers. In order to avoid their inclusion in the index feed, the website URLs of such entities may be added to a blacklist In one embodiment, the index feed may be employed by a search engine to facilitate retrieval of information pertaining to the menu items, the food providers, and so forth. In another embodiment, the index feed may be used for compiling a restaurant guide. The restaurant guide may be circulated in print, or online.

Process

Figure 3:
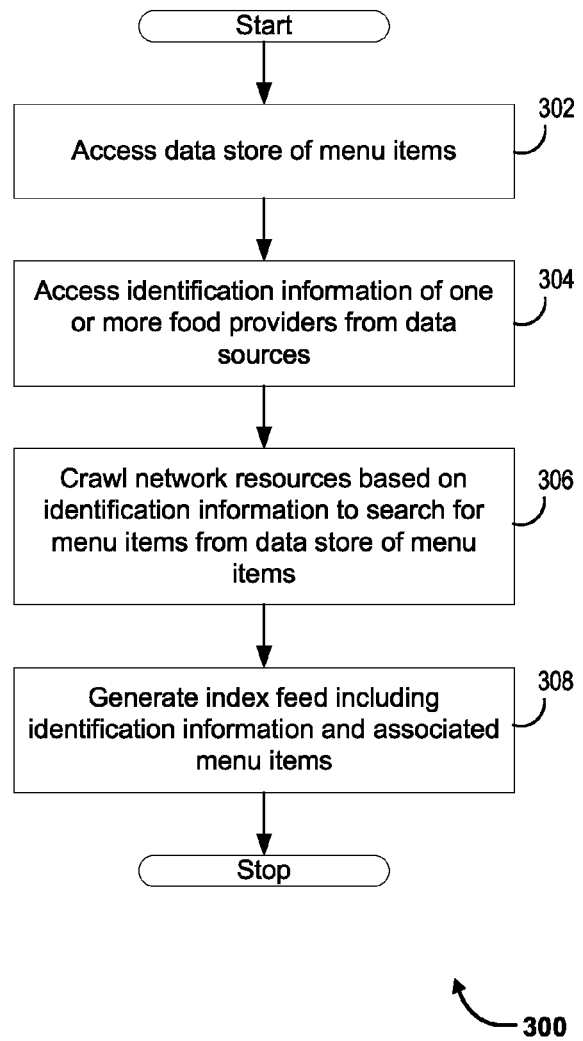
FIG. 3 is a flowchart illustrating one example process for associating restaurants with a set of menu items, according to one embodiment of the present invention.

FIG. 3 is a flowchart illustrating an example process for indexing network resources. At step 302, indexing system 102 accesses a data store of menu items. This data store of menu items is a global list of the one or more menu items served by one or more food providers. In one embodiment, the menu items list is created by crawling one or more restaurant aggregators 108 and extracting one or more menu items. The menu items of the data store may be de-duplicated. In one embodiment, data store may be subject to editorial review to minimize false positives.

At step 304, indexing system 102 accesses identification information associated with the one or more food providers, from one or more data sources. The identification information may include a name, a street address, a phone number, a category, a website URL, a website URL, and so forth. The data sources may include directories such as Yellow Pages, Yellow Pages Exchange, Yahoo! Local, and so forth.

At step 306, indexing system 102 crawls one or more network resources based on the identification information, to search for the menu items included in the data store. Indexing system 102 may create a crawl list based on the identification information. For instance, indexing system 102 may use the website URL to directly add to the crawl list. Indexing system 102 may also add the URLs of the network resources such as restaurant aggregators 108, and review resources 112. Indexing system 102 may use the name of the food provider, street address of the food provider, and the category of the food provider to search for the food providers in the URLs corresponding to restaurant aggregators 108, and review resources 112. Indexing system 102 may then download the content from the URLs, and search for menu items in the downloaded content. Indexing system 102 may use regular expressions to search for the menu items in the downloaded content. Indexing system 102 may then store the searched menu items in a TSV file, the searched menu items being associated with the URL of the downloaded content.

At step 308, indexing system 102 generates an index feed. The index feed includes the identification information of the one or more restaurants and the menu item associated with the identification information of the corresponding food providers based on the output of step 306. Indexing system 102 may match the identification information of the food providers, and the URLs in the TSV files, to associate the menu items with the identification information of the food providers.

The index feed may then be employed by a search engine to allow searching for food providers using menu items. Alternatively, the index feed may also be used to create a food provider directory, a restaurant guide, and so forth, which may be provided to users online, or in print form.

FIG. 4 illustrates an example interface 400 for searching food providers using menu items. A user may enter a search query in a search box 402. A user may enter a search query in natural language or using basic Boolean operators. For instance, if the user wants to search for restaurants which serve orange chicken in New York then he may use a search query such as "orange chicken in New York", or "Orange chicken near NY", and so forth. An example search query using Boolean operators may be "Orange chicken AND (Sunnyvale OR Bay area OR Hollywood)". A search button 404 issues a command to a search engine employing the index feed generated by indexing system 102. Search button 404 initiates the search of the index feed and retrieval of results of one or more food providers matching the search criteria.

The search engine may retrieve the identification information of the food providers that serve the menu items searched by the user. The search engine may use the index feed, and the food provider list, to display the identification information of the food providers such as the name, the address, the website URL, telephone numbers, and so forth. The search engine may also display a short excerpt of the text including the menu item searched by the user. The user may then view the complete web page search result by clicking on the website URL.

Indexing System Architecture

Figure 5:
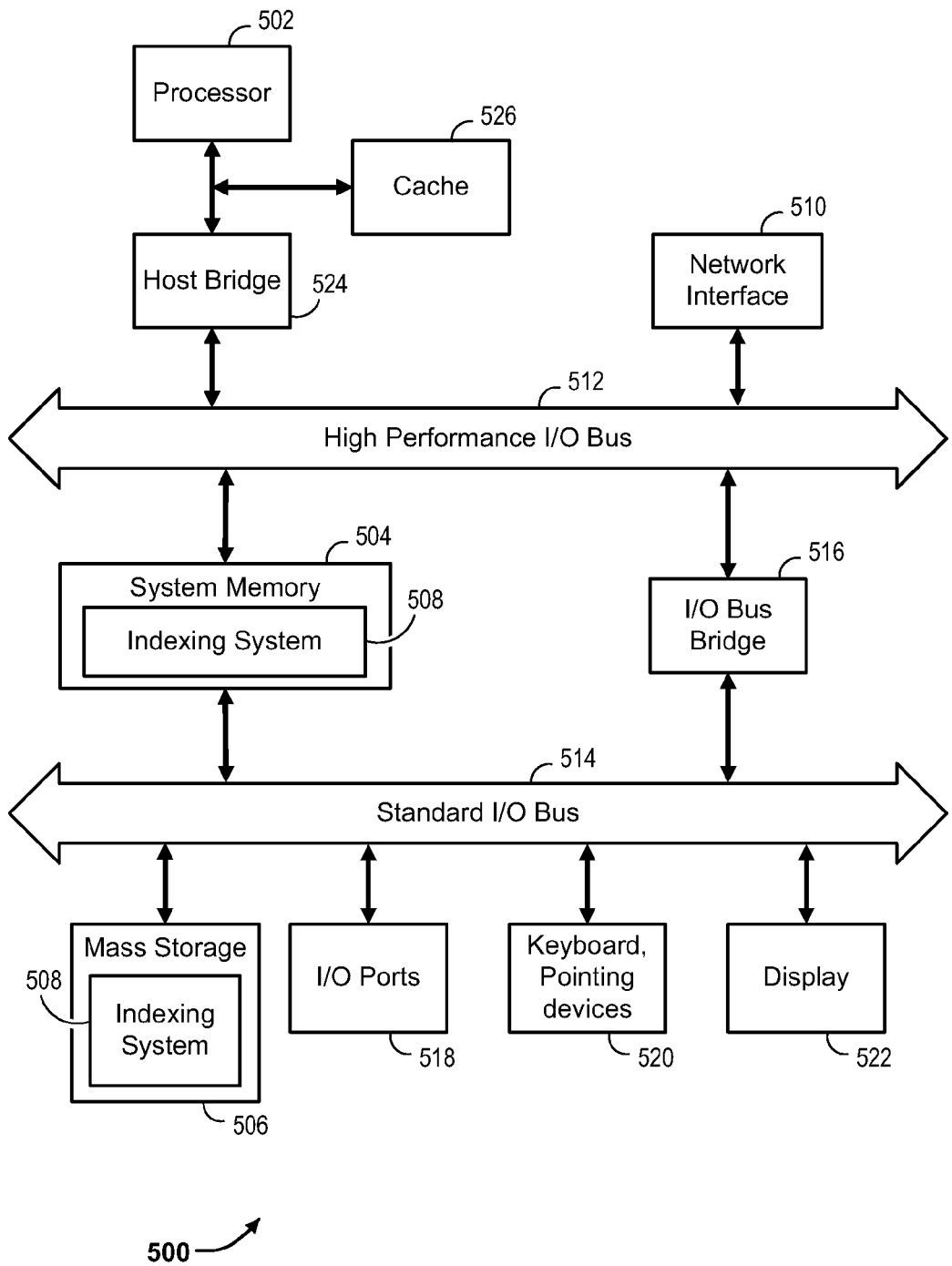
FIG. 5 is a schematic diagram illustrating an example computing system for indexing food providers, according to one embodiment of the present invention.

FIG. 5 illustrates an example hardware system 500 to implement indexing system 102 according to one embodiment. In various embodiments, hardware system 500 may be implemented as a computing node in a grid computing system. Hardware system 500 includes at least one processor 502, a system memory 504, and mass storage 506. The system memory 504 has stored therein one or more application software, programming instructions for implementing indexing system 508, an operating system and drivers directed to the functions described herein. Mass storage 506 provides permanent storage for the data and programming instructions for indexing system 508, whereas system memory 504 (e.g., DRAM) provides temporary storage for the data and programming instructions when executed by processor 502. The process flow of the programming instructions for indexing system 508 is described in detail in conjunction with FIG. 3. In one embodiment, the data stores may reside in mass storage 506. A network/communication interface 510 provides communication between hardware system 500 and any of a wide range of networks, such as an Ethernet (e.g., IEEE 802.3) network, etc. Additionally, hardware system 500 includes a high performance input/output (I/O) bus 512 and a standard I/O bus 514. System memory 504 and network/communication interface 510 couple to bus 512. Mass storage 506 couple to bus 514. I/O Bus Bridge 516 couples the two buses 512 and 514 to each other.

In one embodiment, process 300 described herein is implemented as a series of software routines run by hardware system 500. These software routines comprise a plurality or series of instructions to be executed by a processor in a hardware system, such as processor 502. Initially, the series of instructions are stored on a storage device, such as mass storage 506. However, the series of instructions can be stored on any suitable storage medium, such as a diskette, CD-ROM, ROM, EEPROM, DVD, Blu-ray disk, etc. Furthermore, the series of instructions need not be stored locally, and could be received from a remote storage device, such as server on a network, via network/communication interface 510. The instructions are copied from the storage device, such as mass storage 506, into system memory 504 and then accessed and executed by processor 502.

In one embodiment, hardware system 500 may also include I/O ports 518, a keyboard and pointing device 520, a display 522 coupled to bus 512. I/O ports 518 are one or more serial and/or parallel communication ports that provide communication between additional peripheral devices, which may be coupled to hardware system 500. A host bridge 524 couples processor 502 to high performance I/O bus 510. Hardware system 500 may further include video memory (not shown) and a display device coupled to the video memory. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

Hardware system 500 may include a variety of system architectures; and various components of hardware system 500 may be rearranged. For example, cache 526 may be on-chip with processor 502. Alternatively, cache 526 and processor 502 may be packed together as a "processor module," with processor 502 being referred to as the "processor core." Furthermore, certain embodiments of the present invention may not require nor include all of the above components. For example, the peripheral devices shown coupled to standard I/O bus 512 may couple to high performance I/O bus 510. In addition, in some embodiments only a single bus may exist with the components of hardware system 500 being coupled to the single bus. Furthermore, hardware system 500 may include additional components, such as additional processors, storage devices, or memories.

An operating system manages and controls the operation of hardware system 500, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Server operating system, available from Microsoft Corporation of Redmond, Wash., the Apple Macintosh Operating System, available from Apple Computer Int. of Cupertino, Calif., UNIX operating systems, and the like. Further, in a grid computing implementation, hardware system 500 may include applications running on a distributed application architecture, such as Apache Hadoop.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

The invention claimed is:

1. A method comprising:
   accessing, by one or more computing systems comprising one or more processors, a data store of food provider menu items;
   acquiring identification information to identify two or more food providers and one or more food provider review resources from one or more data sources, the identification information comprising Uniform resource locators (URLs) for the two or more food providers and for the one or more food provider review resources;
   crawling, by the one or more computing systems, one or more websites for the two or more food providers associated with the URLs to a first depth and the one or more food provider review resources to a second depth based on the identification information to search for one or more food provider menu items in the data store of food provider menu items associated with corresponding ones of the two or more food providers, wherein the first depth is different from the second depth; and
   generating, by the one or more computing systems, a search engine index feed for a special purpose food provider search engine, the search engine index feed comprising the identification information of the corresponding ones of the two or more food providers, and the one or more food provider menu items associated with the identification information of the corresponding ones of the two or more food providers based on the crawling.

2. The method of claim 1, further comprising:
   crawling one or more restaurant aggregator web sites to extract the one or more food provider menu items; and
   storing the one or more food provider menu items in the data store.

3. The method of claim 2, further comprising de-duplicating the one or more food provider menu items of the data store.

4. The method of claim 2, further comprising excluding one or more food provider menu items from the data store in response to the one or more food provider menu items appearing less than a predefined threshold in the data store.

5. The method of claim 2, further comprising operator review of the one or more food provider menu items of the data store.

6. The method of claim 1, wherein the identification information comprises one or more of a restaurant name, an address, a phone number, a restaurant category, or a web site URL.

7. The method of claim 1, wherein the index feed is accessible to the special purpose food provider search engine to perform a search for one or more of the food providers based on a query comprising one or more of the one or more food provider menu items.

8. A system comprising:
   one or more network interfaces;
   at least one processor;
   a memory; and
   computer program code stored in a computer readable storage medium executable by the at least one processor to:
   access a data store of one or more food provider menu items;
   access identification information associated with two or more food providers and one or more food provider review resources from one or more data sources, the identification information comprising website Uniform resource locators (URLs) for the two or more food providers and for the one or more food provider review resources;
   crawl one or more websites for the two or more food providers associated with the URLs to a first depth and the one or more food provider review resources to a second depth based on the identification information to search for one or more food provider menu items in the data store of one or more food provider menu items associated with corresponding ones of the two or more food providers, wherein the first depth is different from the second depth; and
   generate an index feed comprising the identification information of the corresponding ones of the two or more food providers, and the one or more food provider menu items associated with the identification information of the corresponding ones of the two or more food providers based on the crawl.

9. The system of claim 8, wherein the computer program code is further executable by the at least one processor to:
   crawl one or more restaurant aggregator web sites to extract the one or more food provider menu items; and
   store the one or more food provider menu items in the data store.

10. The system of claim 9, wherein the computer program code is further executable by the at least one processor to de-duplicate the one or more food provider menu items of the data store.

11. The system of claim 9, wherein the computer program code is further executable by the at least one processor to exclude one or more food provider menu items from the data store in response to the one or more food provider menu items appearing less than a predefined threshold in the data store.

12. The system of claim 8, wherein the identification information comprises one or more of a restaurant name, an address, a phone number, a restaurant category, or a web site URL.

13. A tangible, non-transitory computer-readable medium encoded with computer-executable instructions executable by at least one processor to:
   access, using one or more computing systems, a data store of food provider menu items;
   access identification information associated with two or more food providers and one or more food provider review resources from one or more data sources, the identification information comprising Uniform resource locators (URLs) for the two or more food providers and for the one or more food provider review resources;
   crawl one or more websites for the two or more food providers associated with the URLs to a first depth and the one or more food provider review resources to a second depth based on the identification information to search for one or more food provider menu items in the data store of food provider menu items associated with corresponding ones of the two or more food providers, wherein the first depth is different from the second depth; and
   generate, using the one or more computing systems, an index feed comprising the identification information of the corresponding ones of the two or more food providers, and the one or more food provider menu items associated with the identification information of the corresponding ones of the two or more food providers based on the crawl.

14. The computer-readable medium of claim 13, wherein the computer-executable instructions are further executable by the at least one processor to:

crawl one or more restaurant aggregator web sites to extract the one or more food provider menu items; and store the one or more food provider menu items in the data store.

15. The computer-readable medium of claim 13, wherein the computer-executable instructions are further executable by the at least one processor to de-duplicate the one or more food provider menu items of the data store.

16. The computer-readable medium of claim 13, wherein the computer-executable instructions are further executable by the at least one processor to exclude one or more food provider menu items from the data store in response to the one or more food provider menu items appearing less than a predefined threshold in the data store.

17. The computer-readable medium of claim 13, wherein the identification information comprises one or more of a restaurant name, an address, a phone number, a restaurant category, or a web site URL.

* * * * *